United States Patent
Vengerov et al.

(10) Patent No.: US 7,606,934 B1
(45) Date of Patent: Oct. 20, 2009

(54) DYNAMIC ROUTING OF I/O REQUESTS IN A MULTI-TIER STORAGE ENVIRONMENT

(75) Inventors: David Vengerov, Sunnyvale, CA (US); Harriet G. Coverston, New Brighton, MN (US); Anton B. Rang, Houlton, WI (US); Andrew B. Hastings, Eagan, MN (US)

(73) Assignee: Sun Microsystems, Inc., Santa Clara, CA (US)

( * ) Notice: Subject to any disclaimer, the term of this patent is extended or adjusted under 35 U.S.C. 154(b) by 811 days.

(21) Appl. No.: 11/077,472

(22) Filed: Mar. 10, 2005

(51) Int. Cl.
*G06F 15/173* (2006.01)
*G06E 1/00* (2006.01)

(52) U.S. Cl. .................... 709/238; 706/21
(58) Field of Classification Search .............. 709/232, 709/238; 706/21
See application file for complete search history.

(56) References Cited

U.S. PATENT DOCUMENTS

| | | | |
|---|---|---|---|
| 2003/0172145 A1* | 9/2003 | Nguyen | 709/223 |
| 2003/0212872 A1* | 11/2003 | Patterson et al. | 711/165 |
| 2004/0068637 A1* | 4/2004 | Nelson et al. | 711/203 |
| 2005/0228619 A1* | 10/2005 | Burnet et al. | 702/189 |
| 2006/0029104 A1* | 2/2006 | Jungck | 370/498 |
| 2006/0053263 A1* | 3/2006 | Prahlad et al. | 711/162 |

OTHER PUBLICATIONS

D. Vengerov, "A Reinforcement Learning Framework for Utility-Based Scheduling in Resource-Contrained Systems"; pp. 16; Feb. 2005.

* cited by examiner

*Primary Examiner*—Nathan J Flynn
*Assistant Examiner*—Chirag R Patel
(74) *Attorney, Agent, or Firm*—Osha • Liang LLP

(57) ABSTRACT

A method for routing an incoming service request is described wherein the service request is routed to a selected storage tier based on that selected storage tier having a predicted value indicating a state having greater utility as compared with the predicted value of the state associated with at least one other storage tier within the storage system. A computer system comprising a multi-tier storage system is described, the multi-tier storage system having a routing algorithm configured to adaptively tune functions which map variables describing the state of each storage tier of the storage system into the average latency experienced by incoming service requests associated with the storage tier.

18 Claims, 4 Drawing Sheets

DYNAMIC ROUTING OF I/O REQUESTS IN A MULTI-TIER STORAGE ENVIRONMENT

STATEMENT REGARDING FEDERALLY SPONSORED RESEARCH OR DEVELOPMENT

This invention was made with United States Government support under contract NBCH020055 awarded by the Defense Advanced Research Projects Agency. The United States Government has certain rights in the invention.

BACKGROUND

In modern computer systems, it is common to combine several physical storage units, such as disk drives, tape drives, compact disc (CD) drives, etc. within a storage system to store and retrieve information needed by the system from time to time, and to provide enough free space to accommodate system operations.

In such computer systems, the latency associated with data operations involving those storage systems often has an effect on the overall efficiency of computer system operations. A high latency often results in delayed execution of processes depending on those data operations, and also slows execution of processes which need to use the results of those operations. Thus, lowering latencies associated with storage system data operations increases overall computer system throughput.

In addition to designing storage systems that employ higher capacity disk drives, designers of such storage systems have moved in recent years to include multi-tiered storage systems having increased data integrity.

Different types and formats of storage systems exist to maintain the data integrity of files stored therein and which provide for data recovery in the case of failure of a portion or all of a disk storage unit. For example, different versions of redundant arrays of independent disks (RAID) use parity bits and other techniques to ensure that a corrupt file may be re-created using data from multiple portions of the array, or may alternatively be retrieved from a non-corrupt portion of the array having a second copy of the file.

Multi-tiered storage systems routinely route incoming requests for data operations based on a fixed set of criteria.

SUMMARY

A method for routing an incoming service request in a multi-tier storage system is described wherein, in one or more embodiments of the present invention, a prediction architecture predicts the benefit of each storage tier (defined, for example, as the utility associated with minimizing the average expected latency of all future requests served by that tier) as a function of its state, and each service request is routed in a way to maximize the total expected sum of benefits of all storage tiers.

A computer system comprising a multi-tier storage system is described, the multi-tier storage system having a routing algorithm to adaptively tune functions which map variables describing the state of each storage tier of the storage system into the average latency experienced by incoming service requests associated with the storage tier.

A multi-tier storage system coupled to the central processing unit each of the storage tiers is characterized one or more of the following: storage capacity, latency associated with completing write requests, latency associated with completing read requests, and average file size. The storage system includes a service request router for routing an incoming service request to one of the storage tiers based at least partially on the predicted value of a state of at least one of the storage tiers.

Other aspects and advantages of the invention will be apparent from the following description and the appended claims.

DETAILED DESCRIPTION

Figure 1:
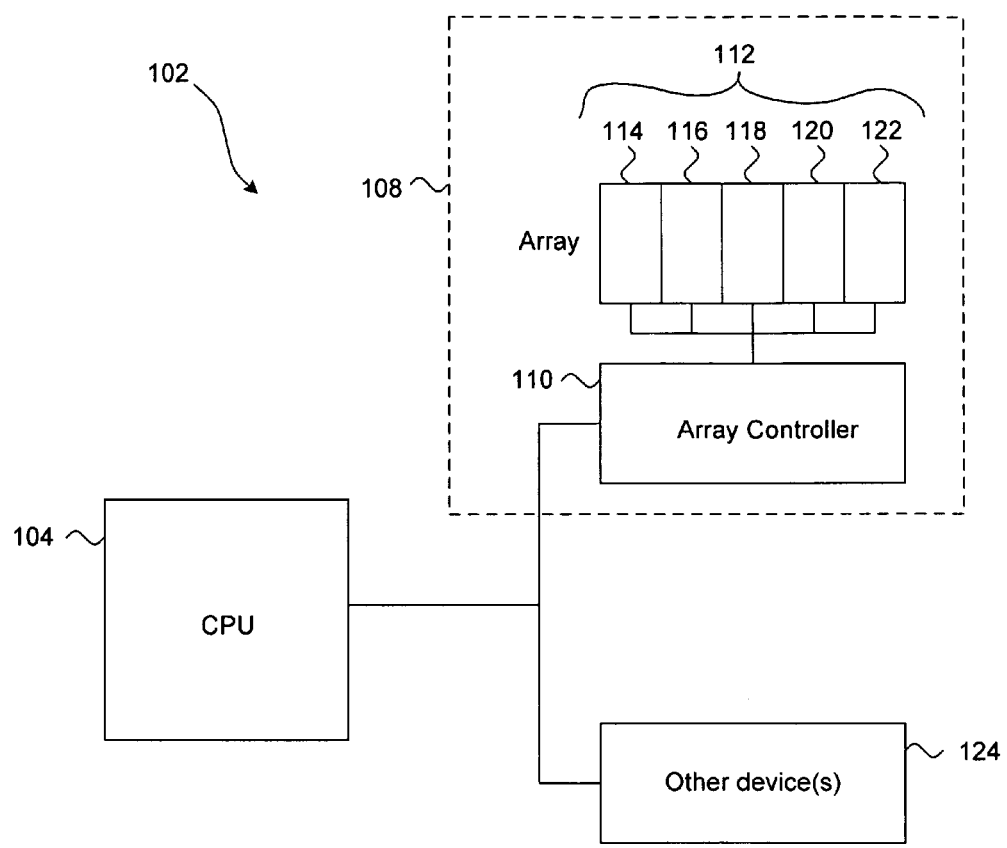
FIG. 1 is a block diagram of a computer system employing a storage system or disk array having multiple storage tiers.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for routing incoming service requests in a multi-tier storage system to a storage tier to maximize the long-term average utility the storage system expects to obtain in the future. In one or more embodiments of the present invention, maximizing utility results in reducing latency.

In one or more embodiments of the present invention, a method and apparatus for routing incoming requests to a storage system is provided wherein predictions are made of values representing future states of storage tiers which are expected to occur following the routing and handling of the service request.

A more generalized approach to the routing problem is characterized as a Markov Decision Process (MDP), which is a formalism for modeling stochastic, sequential decision problems. In this approach, at any given time, a storage tier is considered to be in some state, the state having characteristics that may be described with respect to disk capacity, available space, average time to read a file, average time to write a file, etc. The prediction architecture evaluates an incoming service request and predicts new values associated with states expected to result from performing one or more actions, such as assigning the service request to a particular storage tier for handling, and executing that service request.

Once the request is handled by the assigned storage tier, a "reward" is received by the service request router, and a new storage tier state exists. The present invention includes, in one or more embodiments of the present invention, reinforcement learning algorithms which adaptively tune the prediction architecture based on state transitions occurring over time. In one or more embodiments of the present invention, the prediction architecture learns which decisions are best by trying them and adjusting the prediction algorithms based on evaluating states resulting from implementing those decisions and completing the associated request.

FIG. 1 is a block diagram of a computer system employing a storage system or disk array having multiple storage tiers. In one or more embodiments of the present invention, computer system 102 includes a central processing unit (CPU) 104, coupled to a storage system 108. Storage system 108 may include array controller 110 coupled to storage array 112 which includes storage tiers 114, 116, 118, 120, and 122. CPU 104 may also be coupled to other devices 124.

Persons of ordinary skill in the art will appreciate that the input and output means of computer system 102 may take other forms. Further, those skilled in the art will appreciate that one or more elements of the aforementioned computer system 102 may be located at a remote location and connected to the other elements over a network. Further, software instructions to perform embodiments of the invention may be stored on a computer readable medium such as a flash memory, compact disc (CD), hard disk drive, diskette, a tape, or any other computer readable storage device.

Array controller 110 manages the operations of storage array 112 in order to accommodate the needs of system 102. Therefore, should system 102 need to retrieve data from or write data to storage system 108, a request to perform the desired operation is prepared and forwarded to array controller 110. In one or more embodiments of the present invention, array controller 110 is configured as a prediction architecture and determines, based on the type of service request and the value of later states of one or more of the various storage tiers 114, 116, 118, 120, and 122, which storage tier should process the request. This decision includes consideration of which storage tier is predicted to have the later state having the greatest utility. The state of a storage tier takes into account various characteristics that affect the latency, and therefore the utility, of the storage system. Such characteristics include, but are not limited to, the speed of the storage tier, the number of requests pending in the storage tier queue, the total size of the write requests in the storage tier queue, and the effective space of the storage tier.

In one or more embodiments of the present invention, array controller 110 is configured as a prediction architecture and determines which storage tier should process the request based at least partly on the predicted value of the future expected state of the storage system 108 as a whole. Thus, rather than computing values of the future expected states of individual tiers, values of future states of the storage system may be predicted based on particular storage tiers having handled the service request. The service request is then assigned to the storage tier so as to maximize the long-term utility for the storage system.

Typical service request types are generally categorized as write requests or read requests. Write requests generally include information that needs to be written to the disk such as when storing a file or a portion of a file, but also include requests to move or duplicate a file, such as when enhancing overall file integrity by storing the file or portions of a file in multiple places in the storage system. Read requests are requests designed to cause the retrieval of one or more portions of a file or files from within storage system 108.

Service requests are typically triggered anytime an application or process needs to either store data or retrieve data from the storage system. Such an application or process may be resident on a single computer within a network of computers, may instead be an application or process executing on a network of computers, an application or process being executed on a node within a grid, etc. Persons of ordinary skill in the art having the benefit of this disclosure will readily appreciate the various possible ways a service request may be generated in accordance with the present invention.

Figure 2:
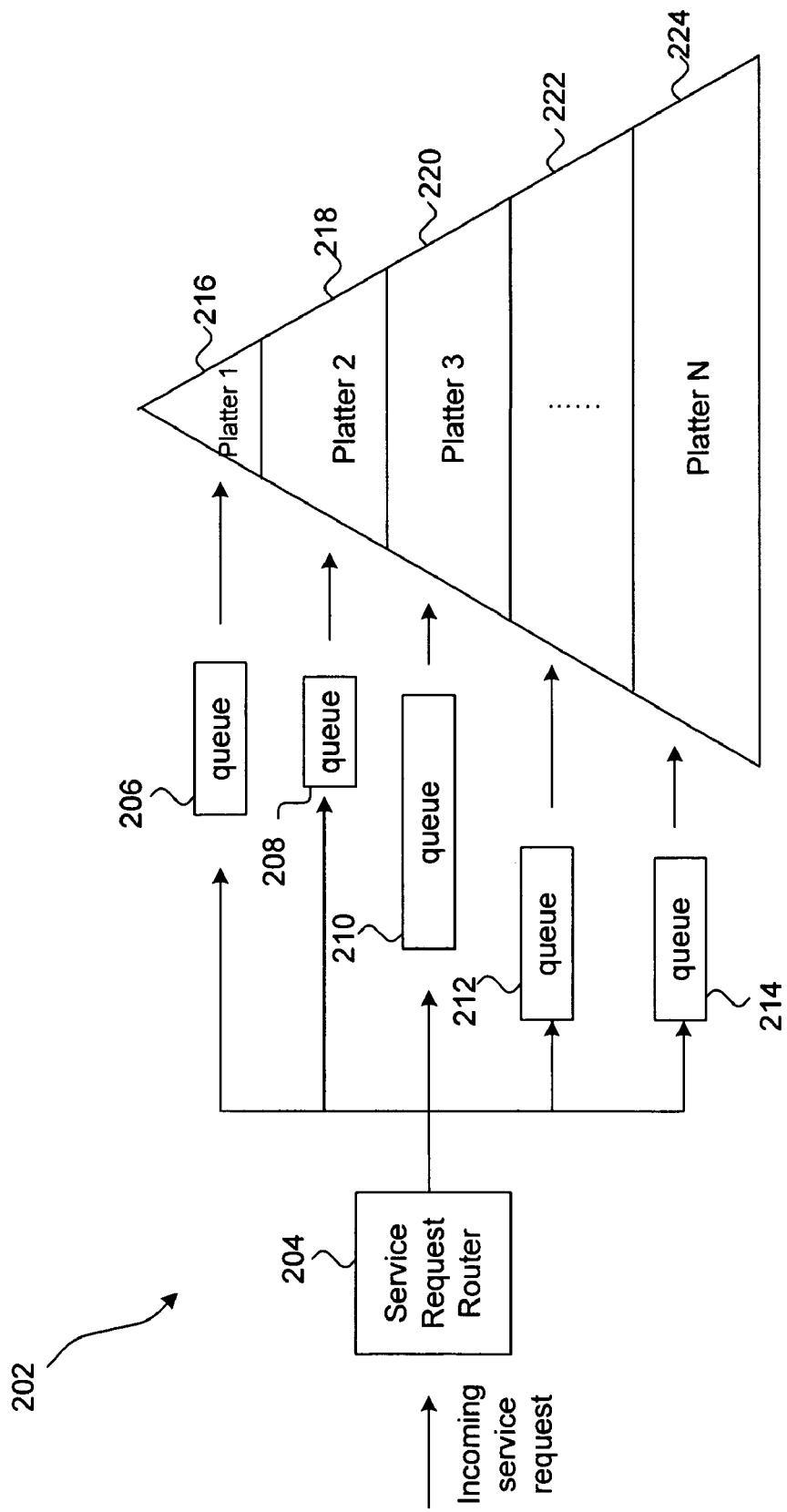
FIG. 2 is a block diagram representation of a tiered storage array according to one or more embodiments of the present invention.

FIG. 2 is a block diagram representation of a storage system according to one or more embodiments of the present invention. Storage system 108 includes service request router 204, which is configured to route incoming service requests 205 to one or more of request queues 206, 208, 210, 212, and 214, which are configured to hold pending requests for respective storage platters 216, 218, 220, 222, and 224. In one or more embodiments of the present invention, a "storage tier" includes at least a request queue (such as queue 206) and a storage platter (such as storage platter 216). In one or more embodiments of the present invention one or more storage platters are configured to share a request queue. Therefore, a storage tier may include a storage platter having a distinct request queue, or alternatively including a portion of a request queue shared by other tiers.

Persons of ordinary skill in the art having the benefit of this disclosure will readily appreciate that a queue may include any form of storage space capable of holding pending requests such as a RAM memory, a flash memory, an EEPROM, etc. It will be further appreciated by those skilled persons that a request queue may be presented as a linked list, a tree, a stack, or any other type of data structure deemed appropriate for the architecture of the particular storage system employing the present invention.

Persons of ordinary skill in the art having the benefit of this disclosure will readily recognize that a storage system employing the present invention may include fewer or more tiers than shown here, as needed to accommodate the requirements of the computer system being serviced, such as computer system 102.

Storage platters such as storage platters 216, 218, 220, 222, and 224 may include any type of physical data storage and the associated reading and writing devices used in computing systems, including hard disks, writeable CD-ROM, tape drives, flash drives, etc. Those of ordinary skill having the benefit of this disclosure will readily know of various types of physical data storage media and how to incorporate and use those media in a computer system according to the present invention.

Storage platters such as storage platters 216, 218, 220, 222, and 224 may be distinguished from one another in many ways, including the data capacity, the speed of writing data, the speed of retrieving data, the amount of free space, etc. Further, considering the relative differences between the individual or shared queues supporting each storage platter such as queues 206, 208, 210, 212, and 214 is also important. The amount of information in each queue pertaining to each platter, the size of the write requests present in a queue, and the amount of time that items have been in the queue waiting to be operated on by a given tier are all factors to consider when determining which storage tiers, such as storage tiers 114, 116, 118, 120, and 122 (all of FIG. 1), should perform a given service request.

Figure 3:
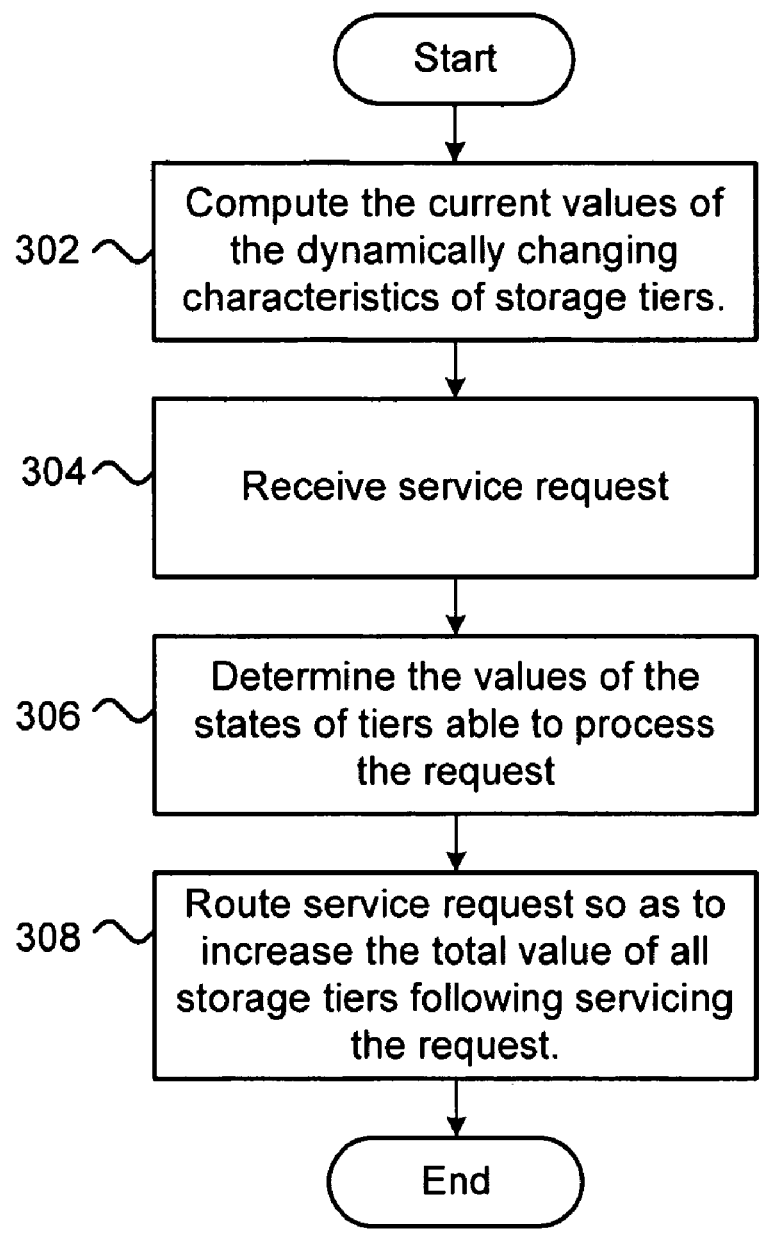
FIG. 3 is a flowchart of a technique for routing requests according to one or more embodiments of the present invention.

FIG. 3 is a flow chart of a technique for routing requests according to one or more embodiments of the present invention. At block 302, characteristics important to determining the state of the various storage tiers are determined. Such characteristics may include, but are not limited to, one or more of the individual data capacities of each storage platter, the various latencies associated with writing data into the various storage platters, the latencies associated with retrieving data from the various storage platters (such as storage platter 220 in FIG. 2), the amount of free space available within each storage platter, etc.

Data operations within a storage system each have an associated "cost" that may be thought of as being similar to latency. Thus, a storage request having a high cost is likely to have a high latency associated therewith. Minimizing future cost (and thus maximizing utility) may be thought of as reducing the latency associated with future states of the storage system that may occur due to the storage system performing an action.

The variables that are used to describe the state of each tier should be correlated with the future costs, and therefore the utility, that the storage system would receive if it were started in that state. Choosing the appropriate state variables is an important component of setting up a reinforcement learning solution to a dynamic optimization problem such as this routing problem.

Many characteristics relevant to the determination of individual storage tier states are also relevant to the determination of the state of the overall storage system 108. This is because the computation of the overall state of storage system 108 is largely dependant on a combination of the individual states of storage tiers such as storage tiers 114, 116, 118, 120, and 122 (in FIG. 1).

At block 304, a service request is received by storage system 108.

Continuing with FIG. 3, at block 306, the values of the states of individual storage tiers able to process the request are determined. Any parameterized value function approximation may be used in order to determine the values of the states. In one embodiment of the present invention, a fuzzy rulebase is used which maps a vector defining the state of a tier into a scalar value representing that state. Persons of ordinary skill in the art having the benefit of this disclosure will readily be aware of how to create and utilize such a fuzzy rulebase. Persons of ordinary skill in the art will readily recognize other parameterized value function approximations that may be used, while remaining within the scope and spirit of the present invention.

By way of example, if the variables used in the determination of the value of a state are represented as x1, x2, x3, etc., then the state of a tier (or system, as the case may be) at a given time is characterized as vector s=[x1(t), x2(t), x3(t)]. A fuzzy rulebase maps that state vector into a scalar value y representing the value of that state. It is the predicted values of the expected future states that are compared, in order to determine which storage tier is assigned a given request for processing. Such a value represents the long-term average utility that the system expects to obtain in the future, when starting from the state s.

Using similar characteristics to those that were relevant to the determination of the value of the state of storage tier 116 above, a state value is determined for each storage tier capable of handling the storage request, for each scenario where the request is routed to tiers able to process the request. Thus, if storage tiers 114, 118, and 120 are capable of handling the request, values of the expected future states are predicted for each storage tier 114, 118, and 120, for each of the three possible routing scenarios (e.g., where the request is routed to storage tier 114, where the request is instead routed to storage tier 118, where the request is instead routed to storage tier 120, etc.).

At block 308, the service request router routes the service request to the tier associated with the state value reflecting the greatest long-term future utility. Once the determination is made as to which storage tier is expected to create the greatest increase in the overall system utility (e.g., which storage tier, after performing the request, maximizes the decrease in overall storage system or computer system latency), the service request is routed to that storage tier for handling.

The technique described above predicts the value of the state of individual storage tiers and assigns a service request to a given storage tier based on the predicted values of the expected future states of storage tiers that are capable of handling the request. In one or more embodiments of the present invention, the determination of values of states and associated routing choices may be made simpler in smaller systems by computing the values of the overall initial and future predicted storage system states resulting from hypothetical routing of the service request to each storage tier, and then selecting the tier that would lead to the greatest utility.

Figure 4:
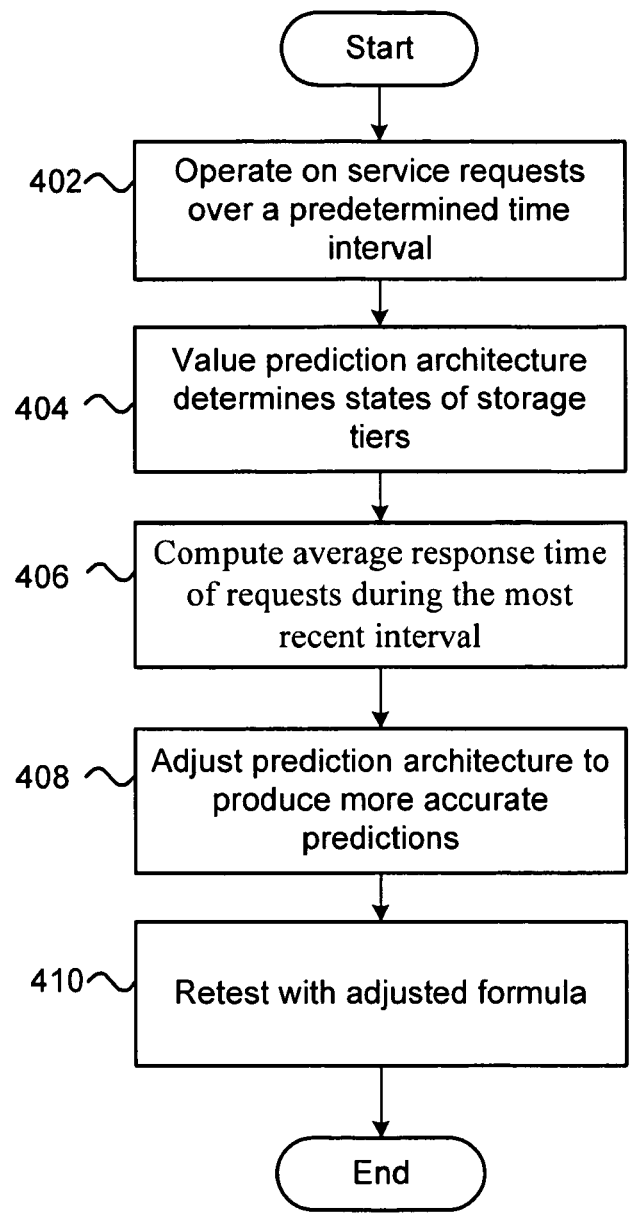
FIG. 4 is a flowchart of a technique for adaptively tuning a routing algorithm according to one or more embodiments of the present invention.

FIG. 4 is a flowchart of a technique for adaptively tuning a prediction architecture according to one or more embodiments of the present invention. Learning methodology is not generally new, and numerous references discuss Markov decision processes, approximating states of systems, etc. For example, see Ratitch, Bohdana and Precup, Doina, *Characterizing Markov Decision Processes*, McGill University, Montreal, Canada (2002).

Previously, when a service request 205 arrived at service request router 204 (both in FIG. 2), storage tiers which could process the service request were identified, and their initial states determined. Predictions were made as to values of expected future states that would occur, depending on which storage tier processed the request. A particular storage tier was then assigned to process the request. The following technique builds on that approach, and applies learning methodology to adjust value prediction models so that more accurate predictions of the values of expected future states may be made.

Adjustments to the value prediction models may be made at any time. In one or more embodiments of the present invention, such adjustments are made at approximately regular time intervals. In one or more embodiments of the present invention, adjustments to the value prediction models are made at intervals loosely corresponding to the number of requests served.

Referring to FIG. 4, the technique begins at block 402 after a plurality of service requests have been operated on by the storage system. At block 404, the value prediction architecture observes the system and determines the value of the current state of the system, using the predetermined variables previously described.

At block 406, the average response time of requests r(t) during the most recent interval is computed. At block 408, the value prediction function V(s, t) (for each tier or for the whole system) is adjusted by an amount change=f(V(s, t), V(s, t−1), r(t)).

In some time intervals, the storage system might not be able to serve any of the requests that were routed during that time interval, since those requests were placed into storage queues for the corresponding tiers.

At block 410, the prediction architecture is re-tested using a new service request, repeating the process of predicting the values of future expected states, and assigning the service request to a given storage tier for processing.

In one or more embodiments of the present invention, at block 302, if the storage system (such as storage system 108 of FIG. 1) is small and storage system or storage states can be described using a small number of variables, the technique described with reference to FIG. 3 may be focused on the overall storage system 108 rather than individual storage tiers, such as storage tiers 114, 116, 118, 120, and 122. Thus, rather than predicting the values of individual states of storage tiers within the storage system, the initial and future values of states of the entire storage system may be predicted based on hypothetically routing the service request to given storage tiers. Correspondingly, at block 310, the routing decision results in the service request being routed to the storage tier predicted to maximize overall system utility.

In one or more embodiments of the present invention, instead of treating each request individually, groups or incoming service requests may be evaluated and routed together. In this embodiment, those of ordinary skill in the art having the benefit of this disclosure will readily recognize that requests to be grouped are each able to be handled by the same one or more storage tiers. Also, to maximize the advantage of grouping requests together, it is beneficial to ensure that such requests cause smaller individual changes in state. Requests expected to cause large state changes should be routed individually.

Computer code implementing the methods presented in this disclosure may be stored in memory in a computer, or alternatively stored in more permanent computer readable medium such as hard drives, optical disks, compact disks, and magnetic tape.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing service requests in a storage system, comprising:
   obtaining a service request associated with the storage system;
   obtaining a first plurality of values describing a current state of a first storage tier in the storage system;
   calculating a first existing utility of the first storage tier based on the first plurality of variables;
   calculating a second existing utility of a second storage tier in the storage system;
   predicting a second plurality of values describing a predicted state of the first storage tier after handling the service request;
   determining a first future utility of the first storage tier based on the second plurality of values;
   determining a second future utility of the second storage tier after handling the service request;
   calculating a first difference between the first future utility and the first existing utility;
   calculating a second difference between the second future utility and the second existing utility;
   calculating a third difference between the second difference and the first difference; and
   routing the service request to the first storage tier for handling based on the third difference, wherein the first difference exceeds the second difference.

2. The method of claim 1, wherein a value of the first plurality of values represents at least one selected from a group consisting of a data capacity of the first storage tier, a total waiting time for all requests in a queue associated with the first storage tier, a total size of a write request associated with the first storage tier, an average latency associated with writing data into the first storage tier, an average latency associated with retrieving data from the first storage tier, and an amount of free space in the first storage tier.

3. The method of claim 1, wherein a value of the first plurality of values is an access frequency of a file stored in the first storage tier.

4. The method of claim 1, wherein the current state is described by a vector and the first plurality of values are components of the vector.

5. The method of claim 1, wherein the first existing utility is inversely proportional to latency associated with the first storage tier.

6. The method of claim 1, wherein calculating the first existing utility comprises evaluating a function using the first plurality of values as parameters.

7. The method of claim 6, further comprising:
   calculating an actual utility of the first storage tier after handling the service request;
   calculating a fourth difference between the actual utility and the first future utility; and
   adjusting the function based on the fourth difference.

8. A computer readable medium storing instruction for routing service requests in a storage system, the instructions comprising functionality to:
   obtain a service request associated with the storage system;
   obtain a first plurality of values describing a current state of a first storage tier of the storage system;
   calculate a first existing utility of the first storage tier based on the first plurality of variables;
   calculate a second existing utility of a second storage tier of the storage system;
   predict a second plurality of values describing a predicted state of the first storage tier after handling the service request;
   determine a first future utility of the first storage tier based on the second plurality of values;
   determine a second future utility of the second storage tier after handling the service request;
   calculate a first difference between the first future utility and the first existing utility;
   calculate a second difference between the second future utility and the second existing utility;
   calculate a third difference between the second difference and the first difference; and
   route the service request to the first storage tier for handling based on the third difference, wherein the first difference exceeds the second difference.

9. The computer readable medium of claim 8, wherein a value of the first plurality of values represents at least one selected from a group consisting of a data capacity of the first storage tier, a total waiting time for all requests in a queue associated with the first storage tier, a total size of a write request associated with the first storage tier, an average latency associated with writing data into the first storage tier, an average latency associated with retrieving data from the first storage tier, and an amount of free space in the first storage tier.

10. The computer readable medium of claim 8, wherein a value of the first plurality of values is an access frequency of a file stored in the first storage tier.

11. The computer readable medium of claim 8, wherein the current state is described by a vector and the first plurality of values are components of the vector.

12. The computer readable medium of claim 8, wherein the first existing utility is inversely proportional to latency associated with the first storage tier.

13. The computer readable medium of claim 8, wherein the instructions to calculate the first existing utility further comprises functionality to:
   evaluate a function using the first plurality of values as parameters.

14. The computer readable medium of claim 13, the instructions further comprising functionality to:

calculate an actual utility of the first storage tier after handling the service request;

calculate a fourth difference between the actual utility and the first future utility; and adjust the function based on the fourth difference.

15. A storage system for routing service requests comprising:

a first storage tier;

a second storage tier;

a predictive architecture configured to:

obtain a service request associated with the storage system, obtain a first plurality of values describing a current state of the first storage tier in the storage system, calculate a first existing utility of the first storage tier based on the first plurality of variables, calculate a second existing utility of the second storage tier in the storage system;

predict a second plurality of values describing a predicted state of the first storage tier after handling the service request, determine a first future utility of the first storage tier based on the second plurality of values, determine a second future utility of the second storage tier after handling the service request, calculate a first difference between the first future utility and the first existing utility, calculate a second difference between the second future utility and the second existing utility, and calculate a third difference between the second difference and the first difference; and a service request router configured to:

route the service request to the first storage tier for handling based on the third difference, wherein the first difference exceeds the second difference.

16. The storage system of claim 15, wherein the predictive architecture comprises a fuzzy rule.

17. The storage system of claim 15, wherein the first existing utility is inversely proportional to latency of the first storage tier.

18. The storage system of claim 15, wherein calculating the first existing utility comprises evaluating a function using the first plurality of values as parameters, and wherein the service request router is further configured to:

calculate an actual utility of the first storage tier after handling the service request;

calculate a fourth difference between the actual utility and the first future utility; and adjust the function to calculate the first existing utility based on the fourth difference.

* * * * *